Nov. 22, 1960 F. C. HALLDEN ET AL 2,961,616

REPEATER SYSTEM

Filed Nov. 21, 1956 3 Sheets-Sheet 1

United States Patent Office 2,961,616

Patented Nov. 22, 1960

2,961,616

REPEATER SYSTEM

Frederick C. Hallden, Floral Park, and Charles J. Hirsch, Locust Valley, N.Y., assignors to Hazeltine Research, Inc., Chicago, Ill., a corporation of Illinois Filed Nov. 21, 1956, Ser. No. 623,565

11 Claims. (Cl. 330—207)

*General*

The present invention is directed to translating systems and, more particularly, to signal-translating or repeater systems which are useful in various applications such as in control or servo systems and in electrocardiographs. Systems of the type under consideration have particular utility as amplifier systems capable of producing an amplification which may be less than or greater than unity. Accordingly, the invention will be described in the environment of an amplifier system.

The so-called direct-current amplifier is capable of amplifying unidirectional potentials and alternating potentials of very low frequency or alternating potentials having a unidirectional component. Difficulties are experienced with such amplifiers in that the operation thereof is disturbed by changes or slow drifts in the anode current of the amplifier tube or tubes resulting from variations in the values of the energizing potentials unless special precautions are taken to compensate for such variations. Balanced systems including pairs of amplifier tubes having substantially identical electrical characteristics, auxiliary circuits for compensating for slight differences in characteristics of the tubes, negative feedback circuits, and voltage regulating power-supply systems are some of the expedients employed to effect stabilization in direct-current amplifiers. As a result, such amplifiers are often quite complex and, for some applications, such as in electrocardiographs, the drift in gain of the amplifiers is greater than may be desired.

Patent 2,795,656 to Charles J. Hirsch, granted June 11, 1957 and entitled "Repeater System," describes and claims a repeater or amplifier system which is useful for applications just mentioned. That patent application discloses an amplifier which includes a circuit for comparing the amplitude of a first signal to be amplified with a second signal having a greater amplitude and frequency and for developing from those signals a train of short duration control pulses when the instantaneous amplitudes of the two signals are substantially equal. These control pulses are utilized momentarily to close a normally open electron switch which then derives a very short duration sample of a large amplitude third signal that is related to or corresponds to the second signal. The samples are then integrated to derive an output signal representing an amplified version of the first signal. While such an amplifier system is very useful, it suffers from the shortcoming that the energy content of individual samples is quite small because of the short durations thereof.

It is an object of the present invention, therefore, to provide a new and improved translating or repeater system which avoids one or more of the above-mentioned disadvantages of prior translating or repeater systems.

It is another object of the invention to provide a new and improved repeater or translating system having a relatively high stability and which is capable of translating both unidirectional potentials of variable magnitude and low-frequency alternating potentials.

It is a further object of the invention to provide a new and improved repeater system which is capable of accurately repeating an applied signal.

It is an additional object of the invention to provide a new and improved repeater system capable of producing a relatively high gain and power output.

In accordance with a particular form of the invention, a translating system comprises means for supplying a first signal having an instantaneous value which varies over a predetermined range of magnitudes, and means for supplying a second signal having an amplitude greater than the aforesaid magnitude range and a frequency greater than those components of the first signal to be repeated. The translating system also includes means for supplying a third signal having a frequency equal to that of the second signal and a phase which differs therefrom by a predetermined amount. The system additionally comprises means including comparison means responsive to the first and second signals for developing a control signal when the first and second signals have substantially equal instantaneous values and the second signal is simultaneously swinging in a predetermined sense, and further including translating means responsive to the aforesaid control and third signal for deriving a fourth signal having recurrent portions with durations effectively twice the aforesaid phase difference. The translating system still further includes means responsive to the fourth signal for deriving a signal representative of the first signal.

For a better understanding of the present invention, together with other and further objects thereof, reference is had to the following description taken in connection with the accompanying drawings, and its scope will be pointed out in the appended claims.

Referring to the drawings.

Figure 3:
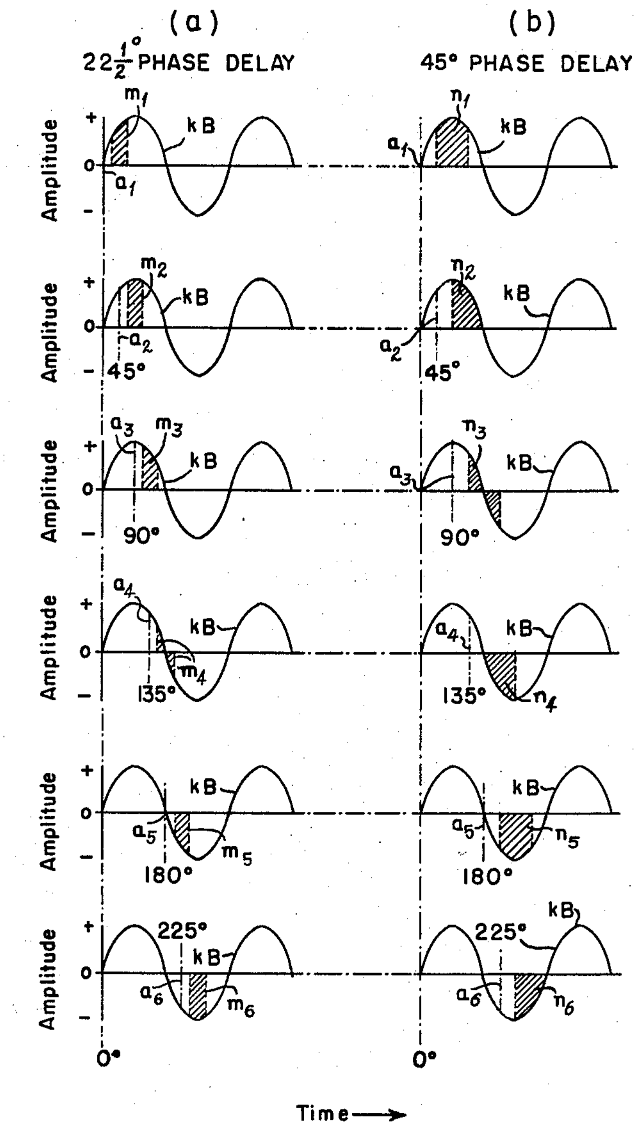
Figure 4:
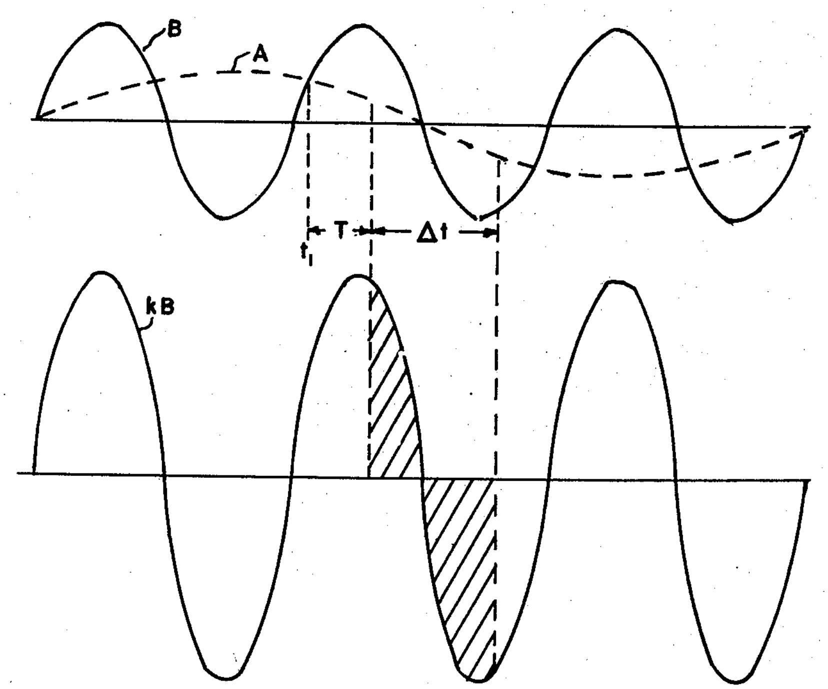

Fig. 3, *a* and *b*, shows graphs which are also useful for the same purpose, and Fig. 4 shows curves used in conjunction with the mathematical analysis of the invention.

Figure 1:
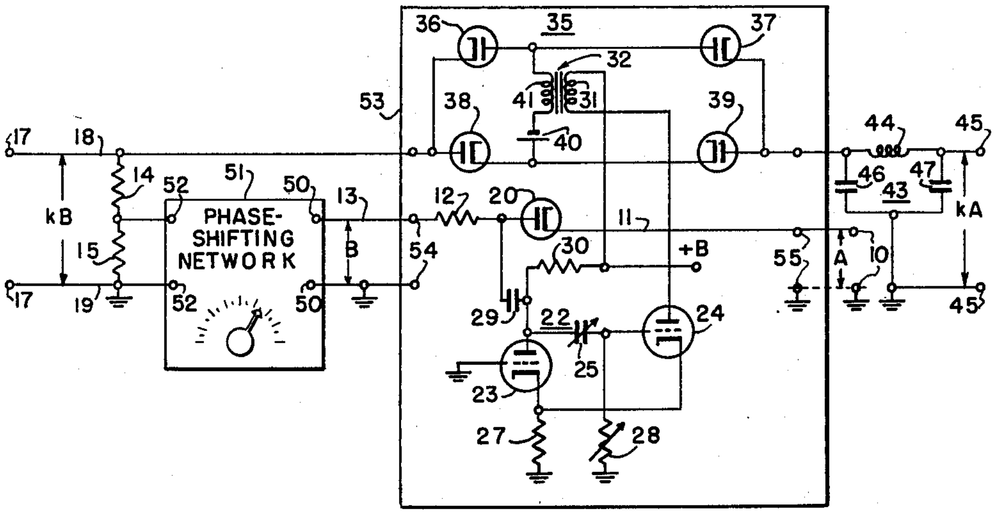
Fig. 1 is a circuit diagram of a translating or repeater system in accordance with a particular form of the present invention.

*Description of translating or repeater system of Fig. 1*

Figure 2:
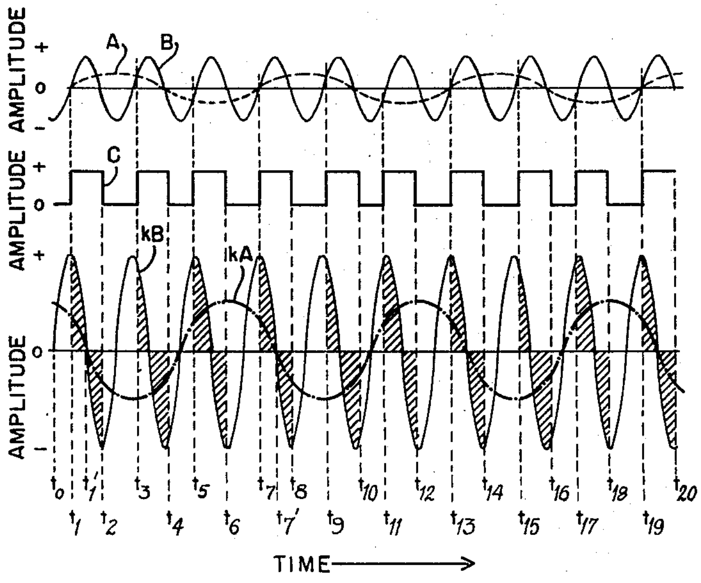
Fig. 2 is a graph which is useful in explaining the operation of the repeater system of Fig. 1.

Referring now to Figs. 1 and 2 of the drawings, the translating or repeater system there represented is a voltage amplifier system comprising means in the form of a pair of input terminals 10, 10 and an electrical conductor 11 for supplying for amplification by a factor $k$ a first effect or signal designated A having an instantaneous value which may vary over a predetermined range of magnitudes. The first signal may be a pulsating unidirectional voltage or may be a suitable alternating voltage such as that represented by the broken line curve A of Fig. 2 of the drawings. The Fig. 1 repeater system also includes means for supplying a second effect or signal having an amplitude greater than the aforesaid magnitude range of the first signal and also having a frequency greater than frequency components of the first signal to be repeated. For example, if the first signal A is a 1000-cycle sine wave, the frequency of the second signal preferably is at least 2000 cycles. For greatest accuracy, the second signal is a sine wave. The means for supplying the second signal includes a pair of terminals 54, 54 and a resistor 12 and may also be considered to include a phase-shifting network 51 of conventional construction having a pair of input terminals 52, 52 and having a pair of output terminals 50, 50 coupled to the input terminals 54, 54. The second signal preferably is the alternating voltage of the sine-wave type represented by the full line curve B of Fig. 2.

The repeater system of Fig. 1 further includes means for supplying a third effect or signal having a frequency equal to that of the second signal and a phase which differs therefrom by a predetermined amount. In particular, the third signal may be a periodic signal having an amplitude $k$ times that of the second signal B and a frequency related to that of the second signal, the constant $k$ being substantially equal to the amplification factor mentioned in the preceding paragraph. This circuit comprises a pair of input terminals 17, 17, electrical conductors 18 and 19, and a voltage divider 14, 15 which is effective to develop across the divider a periodic voltage such as that represented by the curve $k$B of Fig. 2. The frequency and the maximum amplitude of this third signal bear a fixed relationship to the corresponding parameters of the second signal B and, in the embodiment represented, the third signal $k$B is integrally related to but different in phase from the second signal B since the latter is derived from that appearing across the resistor 15 by way of the phase-shifting network 51 and thus constitutes a phase-shifted version of the signal $k$B. The phase-shifting network 51 may be adjustable and may afford a phase advance or delay with relation to the second signal within the range 20°–90°. For convenience, it will be assumed that it affords a phase delay. While the upper limit of the phase delay is 90°, a lower limit below 20° is not particularly attractive since the power output of the amplifier begins to become smaller than is desired for most applications.

The repeater system also comprises a means 53 including comparison means responsive to the first and second signals A and B, respectively, for developing a control effect in the form of control pulses when those signals have substantially equal instantaneous values and the aforesaid second signal is simultaneously swinging in a predetermined or positive sense. This comparison means includes a unidirectionally conductive device such as a diode 20 having its anode connected to one terminal of the resistor 12 and its cathode connected through the conductor 11 to the ungrounded one of the terminals 10, 10. The comparison means further includes a pulse generator which may comprise a relaxation oscillator such as a conventional univibrator 22 of the cathode-coupled type having its elements so proportioned that it normally has a stable operating condition but may be triggered to its unstable condition for brief operation thereat by a suitable control effect. This univibrator includes a pair of electron-discharge devices comprising triodes 23 and 24, the anode of the former being cross-coupled through a condenser 25 and the cathodes of the two being connected to ground through a resistor 27. The control electrode of tube 23 is directly connected to ground and the control electrode of the tube 24 is connected to ground through a grid-leak resistor 28. The anode of tube 23 is connected to the anode of the diode 20 through a coupling condenser 29 and is also connected to a source of potential +B through a load resistor 30 while the anode of tube 24 is connected to that source through the primary winding 31 of a transformer 32. The parameters of the univibrator 22 are such that the tube 24 is normally conductive and the tube 23 is normally biased to cutoff by the positive potential developed at the cathodes of the tubes. The resistor 30 and the condenser 29 may be proportioned to differentiate a signal applied to the univibrator from the anode of the diode 20 and the time constant of the resistor-condenser network 28, 25 is such that a relatively long duration output pulse is developed in the anode circuit of tube 24 in response to a pulse applied to the control electrode thereof. The network 28, 25 is preferably adjustable so that tube 24 develops an output pulse having a duration which is substantially twice that of the selected delay angle imparted to the signal translated from the input terminals 52, 52 to the output terminals 50, 50 of the phase-shifting network 51. Thus, the network 28, 25 has a time constant within the range of 40°–180° with reference to the signal applied to the input terminals 52, 52 of the phase-shifting network 51.

The means 53 further includes a translating channel which has a nonlinear translating characteristic and is coupled to the described comparison circuit for translating during substantially the duration of each of the aforesaid output pulses of the univibrator 22 a fourth signal related to the third signal $k$B and having recurrent portions with durations effectively within the aforesaid range of 40°–180° and, hence, twice the phase difference afforded by the phase-shifting network 51. This translating channel comprises a normally open electron-discharge switching circuit 35 containing a pair of parallel branches. One branch includes a pair of unidirectionally conductive devices such as diodes 36 and 37, the cathode of the diode 36 being connected to the junction of a terminal 17 and the resistor 14 and its anode being connected to the anode of the diode 37. The other branch includes a pair of diodes 38 and 39 having interconnected cathodes, the anode of the diode 38 being connected to the junction of the terminal 17 and resistor 14 and the anode of the diode 39 being connected to the cathode of the diode 37. The positive terminal of a biasing battery 40 is connected to the cathodes of the diodes 38 and 39 and its negative terminal is connected through the secondary winding 41 of the transformer 32 to maintain the four diodes in a normally nonconductive condition.

The repeater system additionally includes a signal modifier coupled to the signal-translating channel or switching circuit 35 and has circuit elements which may be proportioned to attenuate the third signal $k$B to derive at the output terminals 45, 45 from the signal translated by the switching circuit a signal $k$A representative of at least the first signal A. This signal modifier preferably comprises a low-pass filter 43 including an inductor 44 connected in series between the anode of the tube 39 and the ungrounded one of the pair of output terminals 45, 45. Condensers 46 and 47 are coupled between the respective terminals of the inductor 44 and the other output terminal 45. The filter network 43 may have a cutoff frequency between the highest frequency component to be repeated of the first signal A and the frequency of the third signal $k$B to attenuate at least the third signal and to derive the output signal $k$A. For example, if the highest frequency component to be repeated of the first signal A is 1000 cycles and the frequency of the third signal $k$B is 2000 cycles, the cutoff frequency of the filter network 43 is between 1000 and 2000 cycles.

*Explanation of operation of system of Fig. 1*

Considering now the operation of the repeater system just described and referring to the curves of Fig. 2, the signal A which varies in the manner represented by broken line curve A is applied to the terminals 10, 10 for translation by the terminals 55, 55 of unit 53 and the conductor 11 to the cathode of the diode 20. The third signal $k$B of the larger amplitude represented in Fig. 2 is also applied to the terminals 17, 17 and, as previously stated, has a frequency equal to that of the second signal B represented by full line and a phase which differs therefrom by a predetermined amount. For the purpose of our initial consideration, it will be assumed that this phase difference has a phase advance of 90° as represented. However, it will be shown subsequently that other suitable phase delays or advances may be employed. There is developed across the resistor 15 a portion of the signal $k$B for translation by the phase-shifting network 51 in a manner to provide a phase delay therein of 90° to the signal translated thereby for application to the anode of the diode 20. The applied second signal is represented by the signal B of curve B. When the second signal applied to the anode of the diode 20 has a predetermined relationship with reference to the signal applied to the cathode thereof, that is, when the signal of curve B swings in a predetermined or positive sense and the instantaneous value thereof just begins to exceed that of the signal of curve A, the diode 20 is rendered conductive thereby causing a current flow in the resistor 12 which, in turn, reduces the potential at the anode of the diode. The positive swing of the voltage wave of curve B at the several instants $t_1$, $t_3$, $t_5$, $t_7$, $t_9$, etc. is represented in Fig. 2. The reduction in the slope of the anode potential of the diode 20 at each of these instants is used to develop a negative transient (not shown) through the differentiating action of condenser 29 and resistor 30. This transient is further differentiated by condenser 25 and resistor 28 to derive short duration pulses for application to the control electrode of the tube 24.

As previously mentioned, the tube 24 is normally conductive and the tube 23 is normally biased to anode-current cutoff. The short duration pulses of negative polarity applied to the control electrode of tube 24 at an instant, such as time $t_1$, are effective to drive that tube to anode-current cutoff and the reduced current flow in the resistor 27 reduces the control electrode-cathode bias of tube 23 so that it becomes conductive. The univibrator 22 remains in its unstable operating condition with the tube 24 nonconductive and the tube 23 conductive for an interval of time, such as $t_1$—$t_2$, determined primarily by the time constant of the resistor 28 and the condenser 25 in the control electrode-cathode circuit of the tube 24. At the end of this interval, the univibrator returns to its stable operating condition until the arrival of another negative pulse of the control electrode of tube 24. During the interval in which the tube 24 is rendered nonconductive, the anode thereof becomes more positive beginning at time $t_1$ and the transformer 32 develops across the secondary winding 41 at time $t_1$ a relatively long duration positive pulse of the type represented by curve C of Fig. 2 for application to the anodes of the diodes 36 and 37. Similar action occurs at times $t_3$—$t_4$, $t_5$—$t_6$, and $t_7$—$t_8$.

The pulses occurring at the times just mentioned are effective to overcome the bias applied by the battery 40 to the diodes of the switching circuit 35 thereby rendering those tubes momentarily conductive for the pulse durations so that a signal-translating path is supplied between the terminals 17, 17 and the input terminals of the filter network 43. After the termination of individual ones of the control pulses of curve C, the switching circuit 35 is rendered nonconductive by the action of the battery 40 and the circuit between the terminals 17, 17 and the input terminals of the filter network 43 is interrupted. The described closings of the switching circuit 35 are effective to translate through that circuit to the input terminals of the filter network 43 a fourth signal or effect related to the third voltage $k$B.

The fourth signal comprises a series of pulse-like pieces of information of the type represented by the shaded areas under the envelope of the curve $k$B of Fig. 2. As previously stated, the third signal $k$B has a phase which leads that of the second signal B by 90°. In accordance with the invention, the recurrent portions of the fourth signal have durations which are effectively twice the aforesaid phase difference. To this end, the intervals $t_1$—$t_2$, $t_3$—$t_4$, $t_5$—$t_6$, etc. represent durations of 180°. The shaded areas representing a portion of the fourth signal during the interval $t_1$—$t_2$ are symmetrically disposed about the axis of the wave $k$B. It will be noted that the positive and negative going portions comprising the shaded areas are equal in value. When this information is integrated by a suitable device, such as a low-pass filter or a loudspeaker, the resultant effect on a device such as the latter on either side of the instant $t_1'$ is nearly zero. The effect occurring at time $t_1'$ has a lead of 90° with relation to the time that the wave of curve B swings positively with reference to the wave of curve A which is to be amplified. At time $t_3$, the second signal shown by curve B swings positively with reference to the first signal represented by curve A and there is derived during the interval $t_3$—$t_4$ another enlarged or 180° sample represented by the shaded area under the curve $k$B during that interval. It will be seen that the negative portion of this sample is greater in area than the positive portion. This would indicate that the portion of the signal derived at about this time at the output terminals of the filter network 43 would be of negative polarity. At time $t_5$, the signal of curve B again swings positively with reference to the signal of curve A and another 180° sample of the signal $k$B is taken and this is shown by the shaded area under that curve during the interval $t_5$—$t_6$. It will now be noted that the positive shaded area is now greater than the corresponding negative area thus indicating that the signal derived during this interval at the output terminals 45, 45 would be positive in character. At time $t_7$, the wave of curve B again swings positively with reference to the wave of curve A. A 180° sample of the signal $k$B is taken during the interval $t_7$—$t_8$, the maximum amplitude portions occurring at time $t_7$—$t_8$ and the minimum or zero amplitude occurring at time $t_7'$. The energy content of the sample taken during the interval $t_9$—$t_{10}$ is more negative in character while that taken during the succeeding interval $t_{11}$—$t_{12}$ is more positive. During the intervals $t_{13}$—$t_{14}$, $t_{15}$—$t_{16}$, $t_{17}$—$t_{18}$, $t_{19}$—$t_{20}$, the cycle of operation repeats itself and corresponds to that occurring during the intervals $t_7$—$t_8$, $t_9$—$t_{10}$, and $t_{11}$—$t_{12}$. The energy represented by the shaded areas of the curve $k$B, after integration by the filter network 43, constitutes an amplified version of the first signal represented by the broken line curve A and this amplified signal is represented by the dash-dot line curve $k$A. It will be observed from the representation that this signal has the same wave form as that of curve A but is advanced 210° of curve A with reference to curve A. This phase-displaced amplified signal will serve to operate many devices such as a loudspeaker just as effectively as an amplified version of the signal of curve A which has suffered no phase displacement. The amplification afforded by the system is determined essentially by the impedance relationship of the series combination of the resistors 14 and 15 with reference to that of the resistor 15.

The following mathematical analysis of the repeater system will facilitate the understanding of the invention. Referring to Fig. 4, assume curve B is equal to $e=B \sin \omega t$ where B is the maximum amplitude of the curve and $\omega$ is the angular frequency. At time $t_1$ curve A, the input signal, is equal to curve B, the comparison signal, and curve B is equal to B $\sin \omega t_1$. If instead of permitting the translating means to pass curve $k$B at time $t_1$ the translating means function at a time T after $t_1$ and for a period $\Delta t$, thereafter, the voltage translated to the condenser 46 is equal to:

$$\int_{\omega(t_1+T)}^{\omega(t_1+T+\Delta t)} kB \sin \omega t d(\omega t) \qquad (1)$$

The answer to Equation 1 is shown as the shaded area of Fig. 4. The voltage translated to condenser 46 must, however, be proportional to the value of curve B at time $t_1$, namely, $e$=B $\sin \omega t_1$. Therefore, Equation 1 must be set equal to $K_1 B \sin \omega t_1$, where $K_1$ is the constant of proportionality:

$$\int_{\omega(t_1+T)}^{\omega(t_1+T+\Delta t)} kB \sin \omega t d(\omega t) = K_1 B \sin \omega t_1 \qquad (2)$$

Integrating and substituting limits:

$$kB[\cos \omega(t_1+T+\Delta t) - \cos \omega(t_1+T)] = K_1 B \sin \omega t_1 \qquad (3)$$

Substituting in Equation 3 the well-known trigonometric identity which expresses the cosine of the sum of two angles, Equation 3 becomes:

$$\cos \omega t_1 \cos \omega(T+\Delta t) - \sin \omega t_1 \sin \omega(T+\Delta t) - \cos \omega t_1 \cos \omega T + \sin \omega t_1 \sin \omega T = K_2 B \sin \omega t_1 \quad (4)$$

where $$K_2 = \frac{K_1}{k}$$

Simplifying Equation 4:

$$\sin \omega t_1[\sin \omega T - \sin \omega(T+\Delta t)] + \cos \omega t_1[\cos \omega(T+\Delta t) - \cos \omega T] = K_2 B \sin \omega t_1 \quad (5)$$

Equating similar terms of Equation 5:

$$\cos \omega(T+\Delta t) - \cos \omega T = 0 \quad (6)$$

$$\sin \omega T - \sin \omega(T+\Delta t) = K_2 B \quad (7)$$

Equation 7 may be satisfied by any values to T and $\Delta t$. Equation 6 may be satisfied by a number of conditions but the important one is:

$$T+\Delta t = -T \quad (8)$$

or $$\Delta t = -2T \quad (9)$$

Equation 9 indicates that if curve $k$B is advanced in phase by the amount $$\frac{\Delta t}{2}$$

the shaded area will begin to be translated to the condenser at time $t_1$ and for a period $\Delta t$ thereafter.

While the operation of the system of Fig. 1 has been described with reference to a third signal $k$B which has a phase advance of 90° with reference to a second signal B, other phase advances or phase delays, as the case may be depending upon one's point of view, may be imparted by the phase-shifting network 51 and the system will afford satisfactory results. However, as previously mentioned, phase advances or delays of less than about 20° result in such short duration samples of the signal $k$B that the power output is not as great as when long duration samples up to a maximum of 90° are employed.

Fig. 3(*a*) represents the various samples of the wave $k$B which might be derived at different instants when the sampling or second signal (not shown) just begins to exceed the amplitude of a first signal (also not shown) which is to be amplified. Fig. 3(*a*) represents the case for a 22½° phase delay imparted by the phase-shifting network 51 and samples which might be derived when the sampling or second signal begins to exceed in magnitude the amplitude of the first signal at the 0°, 45°, 90°, 135°, 180°, and 225° instants along the sampling wave. At the 0° instant, the wave $k$B is delayed by 22½° with reference to the sampling wave or second signal and, since the sampling interval has a duration of 45° or twice that of the time delay, the sample may be represented by the shaded area $m_1$. Assuming next that the second or sampling signal was swinging positively and exceeded the amplitude of the wave to be amplified at the 45° instant of the second signal, then the sample $m_2$ of the signal $k$B would have a duration of 45° and would be centered about the 90° angle of the wave $k$B. It will be seen that this sample has a larger positive value than that of the sample $m_1$. Assuming next that at the 90° instant the second signal was swinging positively and exceeding the amplitude of the first signal, then the sample $m_3$ of the signal $k$B would have a duration of 45° and would be centered about the 135° angle of the wave $k$B. This sample is smaller than that of the sample $m_2$. Assuming now that a similar condition exists at the 135° point of the wave $k$B, then the derived sample would have positive and negative going portions $m_4$ centered about the 180° point of the wave $k$B. The energy representing the samples $m_4$ is relatively small. Assuming now a condition similar to those previously mentioned occurs at 180° and 225° points along the wave $k$B, then the samples $m_5$ and $m_6$, respectively, may be represented as in Fig. 3(*a*). It will be seen that sample $m_6$ is larger than $m_5$ which, in turn, is larger than the samples $m_4$. As additional samples are taken (which have not been shown, however, to simplify the illustration), it will be clear that their values, after integration, wax and wane in a manner similar to that represented by curve $k$A of Fig. 2.

In Fig. 3(*b*) there is represented a similar situation wherein the phase delay afforded by the phase-shifting network 51 is 45° and the control pulses developed by the univibrator 22 have a 90° duration. Thus, samples $n_1$, $n_2$, $n_3$, $n_4$, $n_5$, and $n_6$ are represented by the shaded areas and each has a 90° duration. The energy contents of these samples vary as represented and the time center of each of these samples differs from those of Fig. 3(*a*) by 45°. When the samples of Fig. 3(*b*) are integrated, however, they develop a signal similar to that of curve $k$A of Fig. 2. The energy content of this signal is greater than that of a signal developed from the samples of Fig. 3(*a*).

When a repeater system of the type represented in Fig. 1 is to be employed as a wide band amplifier, it is preferable that the frequency of the sine-wave voltages $k$B and B be large with reference to the frequency of the voltage A in order that the sampling frequency be high to develop an output voltage $k$A across the terminals 45, 45 accurately representative of the applied voltage A. It is usually preferable that the frequency of the voltages A and B be sufficiently different so that the filter network 43 can be of relatively inexpensive construction for attenuating high-frequency components of the samples of the third signal translated by the switching circuit 35.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A translating system comprising: means for supplying a first signal having an instantaneous value which varies over a predetermined range of magnitudes; means for supplying a second signal having an amplitude greater than said magnitude range and a frequency greater than components of said first signal to be repeated; means for supplying a third signal having a frequency equal to that of said second signal and a phase which differs therefrom by a predetermined amount; means including comparison means responsive to said first and second signals for developing a control signal when said first and second signals have substantially equal instantaneous values and said second signal is simultaneously swinging in a predetermined sense, and further including translating means responsive to said control and third signals for deriving a fourth signal having recurrent portions with durations effectively twice said phase difference; and means responsive to said fourth signal for deriving a signal representative of said first signal.

2. A translating system comprising: means for supplying a first signal having an instantaneous value which varies over a predetermined range of magnitudes; means for supplying a second signal having an amplitude greater than said magnitude range and a frequency at least twice as great as components of said first signal to be repeated; means for supplying a third signal having a frequency equal to that of said second signal and a phase which differs therefrom by a predetermined amount; means including comparision means responsive to said first and second signals for developing a control signal when said first and second signals have substantially equal instantaneous values and said second signal is simultaneously swinging in a predetermined sense, and further including translating means responsive to said control and third signals for deriving a fourth signal having recurrent portions with durations effectively twice said phase difference; and means responsive to said fourth signal for deriving a signal representative of said first signal.

3. A signal-translating system comprising: means for supplying a first signal having an instantaneous value which varies over a predetermined range of magnitudes; means for supplying a second signal having an amplitude greater than said magnitude range and a frequency greater than components of said first signal to be repeated; means for supplying a third signal having a frequency equal to that of said second signal and a phase which differs therefrom by a predetermined amount; means including comparison means responsive to said first and second signals for developing a control signal when said first and second signals have substantially equal instantaneous values and said second signal is simultaneously swinging in a predetermined sense, and further including a switching circuit responsive to said control and third signals for deriving a fourth signal having recurrent portions with durations effectively twice said phase difference; and means responsive to said fourth signal for deriving a signal representative of said first signal.

4. A signal-translating system comprising: means for supplying a first signal having an instantaneous value which varies over a predetermined range of magnitudes; means for supplying a second signal having an amplitude greater than said magnitude range and a frequency greater than components of said first signal to be repeated; means for supplying a third signal having a frequency equal to that of said second signal and a phase which differs therefrom by a predetermined amount; means including a unidirectionally conductive comparison means responsive to said first and second signals for developing a control signal when said first and second signals have substantially equal instantaneous values and said second signal is simultaneously swinging in a predetermined sense, and further including signal-translating means responsive to said control and third signals for deriving a fourth signal having recurrent portions with durations effectively twice said phase difference; and means responsive to said fourth signal for deriving a signal representative of said first signal.

5. A signal-translating system comprising: means for supplying a first signal having an instantaneous value which varies over a predetermined range of magnitudes; means for supplying a second signal having an amplitude greater than said magnitude range and a frequency greater than components of said first signal to be repeated; means for supplying a third signal having a frequency equal to that of said second signal and a phase which differs therefrom by a predetermined amount; means including a unidirectionally conductive comparison means responsive to said first and second signals for developing a control signal when said first and second signals have substantially equal instantaneous values and said second signal is simultaneously swinging in a predetermined sense and including a pulse generator responsive to said control signal for developing therefrom control pulses having durations substantially twice said phase difference, and further including signal-translating means responsive to said control and third signals for deriving a fourth signal having recurrent portions with durations effectively twice said phase difference; and means responsive to said fourth signal for deriving a signal representative of said first signal.

6. A signal-translating system comprising: means for supplying a first signal having an instantaneous value which varies over a predetermined range of magnitudes; means for supplying a second signal having an amplitude greater than said magnitude range and a frequency greater than components of said first signal to be repeated; means for supplying a third signal having a frequency equal to that of said second signal and a phase which differs therefrom by a predetermined amount; means including comparison means responsive to said first and second signals for developing a control signal when said first and second signals have substantially equal instantaneous values and said second signal is simultaneously swinging in a predetermined sense and including a univibrator with a time constant substantially twice said phase difference and responsive to said control signal for developing control pulses having durations substantially twice said phase difference, and further including signal-translating means responsive to said control and third signals for deriving a fourth signal having recurrent portions with durations effectively twice said phase difference; and means responsive to said fourth signal for deriving a signal representative of said first signal.

7. An amplifier system comprising: means for supplying for amplification by a factor $k$ a first signal having an instantaneous value which varies over a predetermined range of magnitudes; means for supplying a second signal having an amplitude greater than said magnitude range and a frequency greater than components of said first signal to be amplified; means for supplying a third signal having an amplitude $k$ times that of said second signal and a frequency equal to that of said second signal and a phase which differs therefrom by a predetermined amount; means including comparison means responsive to said first and second signals for developing a control signal when said first and second signals have substantially equal instantaneous values and said second signal is simultaneously swinging in a predetermined sense, and further including signal-translating means responsive to said control and third signals for deriving a fourth signal having recurrent portions with durations effectively twice said phase difference; and means responsive to said fourth signal for deriving a signal representative of said first signal.

8. A signal-translating system comprising: means for supplying a first signal having an instantaneous value which varies over a predetermined range of magnitudes; means for supplying a second signal having an amplitude greater than said magnitude range and a frequency greater than components of said first signal to be repeated; means for supplying a third signal having a frequency equal to that of said second signal and a phase which differs from that of said second signal by a predetermined angle within the range of 20° to 90°; means including comparison means responsive to said first and second signals for developing a control signal when said first and second signals have substantially equal instantaneous values and said second signal is simultaneously swinging in a predetermined sense, and further including signal-translating means responsive to said control and third signals for deriving a fourth signal having recurrent portions with durations effectively within the range of 40° to 180°; and means responsive to said fourth signal for deriving a signal representative of said first signal.

9. A signal-translating system comprising: means for supplying a first signal having an instantaneous value which varies over a predetermined range of magnitudes; means including a phase-shifting network for supplying a second signal having an amplitude greater than said magnitude range and a frequency greater than components of said first signal to be repeated and for supplying a third signal having a frequency equal to that of said second signal and a phase which lags that of said second signal by a predetermined angle within the range of 20° to 90°; means including comparison means responsive to said first and second signals for developing a control signal when said first and second signals have substantially equal instantaneous values and said second signal is simultaneously swinging in a predetermined sense, and further including signal-translating means responsive to said control and third signals for deriving a fourth signal having recurrent portions with durations effectively within the range of 40° to 180°; and means responsive to said fourth signal for deriving a signal representative of said first signal.

10. An amplifier system comprising: means for supplying a first signal having an instantaneous value which varies over a predetermined range of magnitudes; means including a phase-shifting network for supplying a second signal having an amplitude greater than said magnitude range and a frequency greater than components of said first signal to be repeated and for supplying a third signal having a frequency equal to that of said second signal and a phase which differs from that of said second signal by a predetermined angle within the range of 20° to 90°; means including a unilaterally conductive comparison means responsive to said first and second signals for developing a control signal when said first and second signals have substantially equal instantaneous values and said second signal is simultaneously swinging in a predetermined sense and including a univibrator with a time constant substantially twice said angle and responsive to said control signal for developing control pulses having durations substantially twice said angle, and further including a normally open electron-discharge switching circuit coupled to said univibrator and closed by individual ones of said control pulses for the duration thereof for deriving a fourth signal having recurrent portions with durations effectively within the range of 40° to 180°; and a filter network responsive to said fourth signal for deriving a signal representative of said first signal.

11. A signal-translating system comprising: means for supplying a first signal having an instantaneous value which varies over a predetermined range of magnitudes; means for supplying a second sine-wave signal having an amplitude greater than said magnitude range and a frequency greater than components of said first signal to be repeated; means for supplying a third sine-wave signal having a frequency equal to that of said second signal and a phase which differs therefrom by a predetermined amount; means including comparison means responsive to said first and second signals for developing a control pulse when said first and second signals have substantially equal instantaneous values and said second signal is simultaneously swinging in a positive sense, and further including signal-translating means responsive to said control pulse and third signal for deriving a fourth signal having recurrent portions with durations effectively twice said phase difference; and means responsive to said fourth signal for deriving a signal faithfully representative of said first signal.

References Cited in the file of this patent

UNITED STATES PATENTS

| | | |
|---|---|---|
| 2,210,028 | Doherty | Aug. 6, 1940 |
| 2,727,141 | Cheek | Dec. 13, 1955 |
| 2,795,656 | Hirsch | June 11, 1957 |